United States Patent [19]
Spacil

[11] 3,821,362
[45] June 28, 1974

[54] HYDROGEN PRODUCTION BY DISSOCIATION OF STEAM WITH LIQUID TIN

[75] Inventor: Henry S. Spacil, Schenectady, N.Y.

[73] Assignee: General Electric Company, Schenectady, N.Y.

[22] Filed: Jan. 13, 1972

[21] Appl. No.: 217,514

[52] U.S. Cl. .............................. 423/657, 423/618
[51] Int. Cl. ............................................ C01b 1/08
[58] Field of Search ............ 423/657, 618, 621, 565

[56] References Cited
UNITED STATES PATENTS

| | | | |
|---|---|---|---|
| 1,019,004 | 2/1912 | Foersterling | 423/618 |
| 1,113,123 | 10/1914 | Innes | 423/621 X |
| 1,362,237 | 12/1920 | Ros | 423/618 |
| 1,586,328 | 5/1926 | Poppenhusen | 423/621 |
| 2,072,375 | 3/1937 | McCallum | 423/621 X |
| 2,565,931 | 8/1951 | Rentschler | 423/565 |
| 2,984,544 | 5/1961 | Joly | 423/621 |
| 3,017,250 | 1/1962 | Watkins | 423/657 |

Primary Examiner—Edward Stern
Attorney, Agent, or Firm—Leo I. MaLossi; Joseph T. Cohen; Jerome C. Squillaro

[57] ABSTRACT

A process is described for the dissociation of steam by liquid tin to form hydrogen gas and solid tin dioxide. The wet hydrogen gas is collected and dried and the tin dioxide is subjected to reduction to form liquid tin that is then recycled.

5 Claims, 1 Drawing Figure

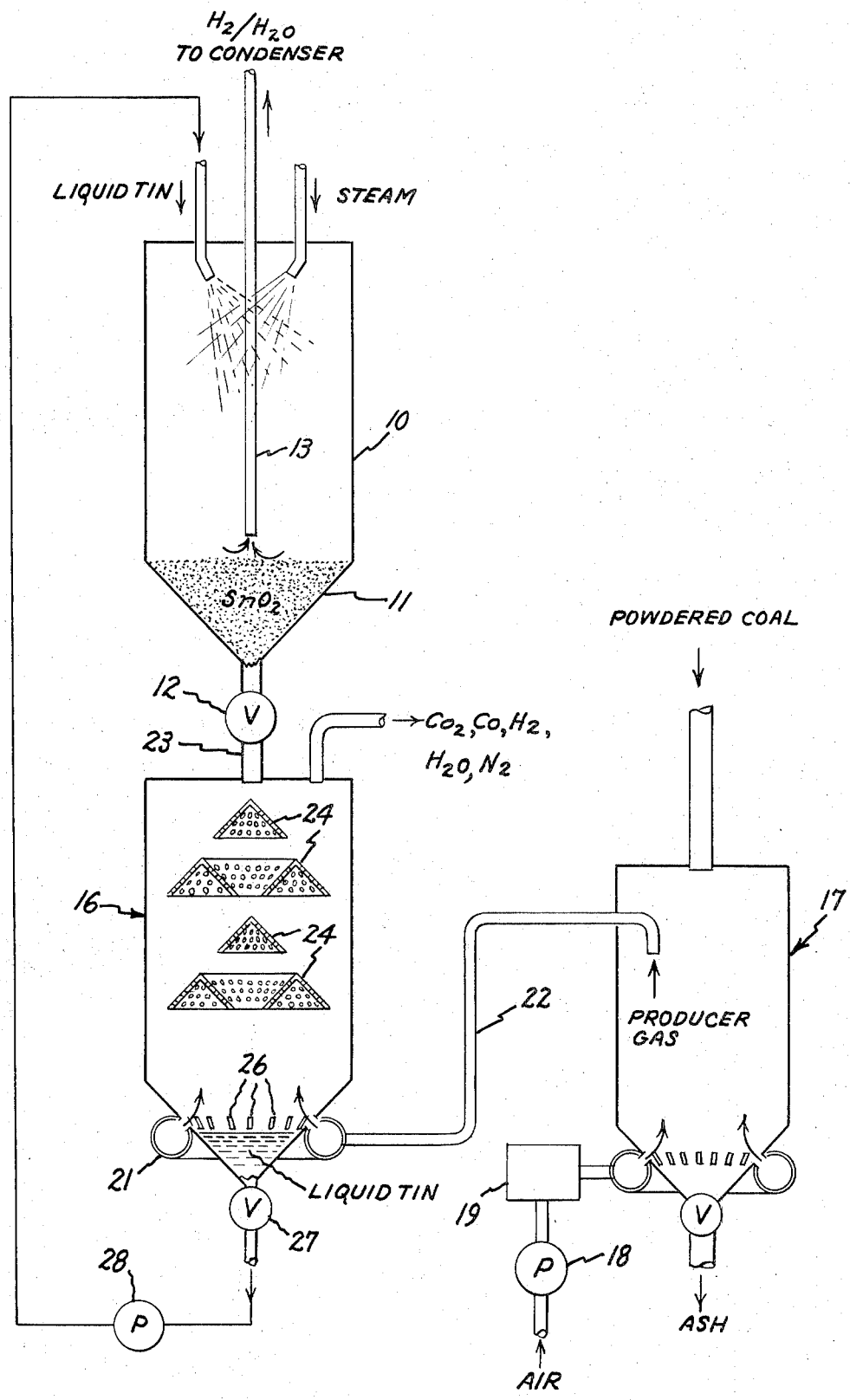

HYDROGEN PRODUCTION BY DISSOCIATION OF STEAM WITH LIQUID TIN

BACKGROUND OF THE INVENTION

The synthesis of hydrogen by the electrolysis of water has in general been found to be uneconomic. Several alternative processes have been investigated; namely, (1) steam reforming of coal or hydrocarbons with the addition of oxygen followed by carbon dioxide scrubbing, (2) steam reforming of coal or hydrocarbons in the presence of a carbon dioxide getter and (3) the dissociation of steam by solid iron to form hydrogen and magnetite, the magnetite then being reduced back to solid iron with producer gas formed by the partial combustion of coal or hydrocarbons. The latter process has been the most successful, but involves the use of packed beds of granular material (iron or magnetite) to achieve a high gas/solid contact area. Sintering of the granular solids in such packed beds constitutes a severe operating problem.

Large volumes of low-cost hydrogen are increasingly required for such applications as the synthesis of high BTU content pipeline gas (essentially methane) by hydrogenation of carbonaceous material derived from coal, and the hydrogenation of hydrocarbons during petroleum refining. The cost of such hydrogenated products depends strongly on the cost of the relatively pure hydrogen required for the synthesis thereof.

SUMMARY OF THE INVENTION

The dissociation of steam is accomplished by contacting the steam with fine droplets of atomized liquid tin, wet hydrogen gas (later dried) and solid tin dioxide being produced in the resulting reaction. The tin dioxide, in turn, is reduced to form liquid tin, facilitating recovery of this metal for recycling to the dissociation step.

DESCRIPTION OF THE PREFERRED EMBODIMENT

The physical and thermodynamic properties of tin and its oxides make it uniquely suited to use in hydrogen production through the dissociation of steam. An excess of steam is brought into contact with finely atomized liquid tin, which had previously been reduced from solid tin dioxide. The very high surface to volume ratio contact thus afforded avoids the problems of employing a packed bed reactor as in the steam-iron process.

The dissociation step is conducted by introducing finely atomized liquid tin (melting point ~232°C) and steam into contact with each other in reactor 10 which may be pressurized. The overall (unbalanced) reaction is as follows:

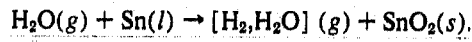

$$H_2O(g) + Sn(l) \rightarrow [H_2, H_2O](g) + SnO_2(s).$$

Excess steam is provided to drive the reaction to the right. The stability of solid $SnO_2$ relative to solid $SnO$ at temperatures below 1,200°C makes tin a very effective oxygen getter.

$SnO_2$ collects in the hopper 11 for release via valve 12 as soon as the process is ready for continuous operation. Although heat may have to be applied initially to reactor 10, this reaction is exothermic. The $H_2/H_2O$ gas mixture is removed via pipe 13 and directed to a condenser (not shown) to remove the $H_2O$ content.

Although the gas mixture over the $Sn(l)$ and $SnO_2(s)$ consists primarily of $H_2$ and $H_2O$, gaseous $SnO$ will also be a minor constituent. This possible avenue for loss of tin through volatization can be neglected at dissociation temperatures below 700°C. If higher temperatures are to be employed, condensation and collection of the SnO are recommended. Operation at pressures in excess of 1 atmosphere does not affect the percent hydrogen in the gas over the liquid tin and $SnO_2$ in the reactor, but such higher pressures will proportionally reduce the content of tin in the gas, since the vapor pressure of $SnO$ over a mixture of liquid tin and $SnO_2$ is nearly independent of total pressure. Thus, a pressurized dissociation step is advantageous both to produce hydrogen at elevated pressures and to reduce tin losses.

The $[H_2, H_2O]$ gas mixture is removed from reactor 10 as the steam and liquid tin continue to be introduced at the desired rate. Oxidation of the liquid tin droplets by steam will result in formation of solid $SnO_2$ particles. Once ready for continuous operation, valve 12 is adjusted to continuously dispense this $SnO_2$ from the dissociation reactor 10 to reduction reactor 16 wherein the solid tin dioxide is reduced to liquid tin preferably at atmospheric pressure as described hereinbelow.

In the embodiment shown a gaseous reductant is prepared in gasifier 17 by the partial combustion with preheated air of a hydrocarbon or a coal product. The resultant reducing atmosphere is essentially producer gas consisting primarily of nitrogen ($N_2$), carbon monoxide (CO) and hydrogen ($H_2$). As shown air is introduced into the system via pump 18 and is moved through heater 19 to gasifier 17. The hot producer gas produced in gasifier 17 is conducted to bustle pipe 21 of reactor 16 via line 22. The tin dioxide powder is introduced via pipe 23 and is distributed by perforated baffles 24 to maximize contact with the reducing gas supplied via openings 26 leading from bustle pipe 21. The reducing gas is provided in excess to favor the production of liquid tin. If desired, all or part of the openings 26 may be located below the surface of the molten tin. In the former case, provision will have to be made to prevent entry of the liquid tin into these openings. In the latter case, means would have to be provided to prevent the entry of liquid tin into openings below the liquid level and to insure a back-pressure at holes above the liquid level.

The liquid tin resulting from the reduction of the $SnO_2$ collects at the bottom of reactor 16 and is recirculated to reactor 11 via valve 27 and pump 28. A low BTU gas containing $CO_2$, CO, $H_2, H_2O$ and $N_2$ is removed from reactor 16 and may be burned to provide heat for reactor 16 or heater 19 using means not shown. $SnO_2$ powder traversing the open volume of reactor 16 without being reduced should float on the liquid tin and remain in contact with the reducing atmosphere thereby insuring reduction.

Preferably, the temperature and pressure for the dissociation reaction (reactor 11) will be about 450° – 750°C and 1 – 25 atmospheres, respectively. Operation at the elevated pressures provides the generated $H_2$ already at pressure. The temperature and pressure in reactor 16 will be 700°–1,100°C and 1–2 atmospheres, respectively. Production of the reducing gas would preferably be at similar pressures.

Other arrangements may be provided for reducing the $SnO_2$. Thus, electrochemical reduction in a halide melt may be feasible and reduction with solid pure carbon has been demonstrated. The reduction of tin dioxide with pure carbon is expressed by the overall (unbalanced) reaction:

$$SnO_2(s) + C(s) \rightarrow Sn(l) + [CO, CO_2] (g).$$

The materials must be mixed and heated. Volatization of SnO can lead to a significant tin content in the gas above about 700°C. Condensation and collection of SnO is, therefore, required for the reduction step, when using solid carbon as a reductant.

Finely powdered $SnO_2$ was mixed with 50/200 mesh coconut charcoal in proportions to give a 10 percent excess of carbon over the amount required for an oxygen/carbon ratio of 1.6 in the gaseous products of reduction (corresponding to the theoretically calculated value of 40 percent CO). About 10 grams of the mixture was packed loosely in an alumina crucible, the top of which was sealed with a porous plug. The crucible was heated in a muffle furnace in a stream of flowing nitrogen, the porous plug preventing the nitrogen from flushing away the gases evolved during the reduction before complete reaction of excess CO with the $SnO_2$, but did allow the reacted gases to escape slowly as the reduction progressed. Heating for two and a half hours at 630°C did not result in any measurable reduction. Heating for 2 hours at 830°C resulted in nearly complete reduction. The major portion of the liquid tin resulting from heating at the higher temperature was present in the form of spheres about 2 to 3 mm in diameter. Some of the smaller spheres showed a bright metallic surface, indicating that complete reduction had occurred, at least locally.

Coal, which would normally be employed in this process for the production of producer gas in reactor 17 is not pure carbon, but also contains of the order of 20 atomic percent hydrogen and up to several atomic percent sulfur. The presence of hydrogen in the producer gas supplied to reactor 16 is not detrimental to the reduction, since $H_2$ will reduce $SnO_2$ about as well as CO. The presence of the sulfur as $H_2S$, however, will lead to the formation of gaseous SnS, and possibly (if sufficient sulfur is present) to the formation of solid or liquid SnS (SnS melts at 882°C). The formation of solid SnS is fortuitous, the tin functioning as a getter for the sulfur and minimizing the release of sulfur to the enviroment. The use of reduction temperatures above about 600°C will require condensation and collection of the gaseous SnS (and perhaps SnO as well) to prevent excessive Sn loss. The solid SnS can then be treated with hydrogen to recover the tin with formation of $H_2S$ that in turn can be processed to recover the sulfur.

When the coal admitted to reactor 17 contains significant quantities of sulfur, it may be preferable to introduce moderate quantities of $CaCO_3$ along with the coal. The idealized overall reaction (unbalanced) is as follows:

$$C(s) + CaCO_3(s) \rightarrow [CO, CO_2] (g) + CaO(s).$$

In this manner the CaO produced acts as a getter for the sulfur by forming CaS, thereby reducing possible loss of tin by the formation of volatile SnS during reduction of the tin dioxide. The CaS can be recovered from the ash or converted to $CaSO_4$ by roasting.

What I claim as new and desire to secure by Letters Patent of the United States is:

1. A process for the production of hydrogen comprising the steps of:
   a. contacting steam with fine droplets of liquid tin at temperatures in the range of from 450° to 750°C to produce a mixture of hydrogen and steam and tin oxide, the tin oxide formed being predominately $SnO_2$ and the steam being supplied in excess to favor the formation of $SnO_2$,
   b. contacting the tin oxide with a carbonaceous material at temperatures in the range of from 700° to 1,100°C to reduce the tin oxide to liquid tin,
   c. recycling the liquid tin so produced into contact with steam in step (a),
   d. removing the mixture of hydrogen and steam and
   e. recovering hydrogen therefrom.

2. The process as recited in claim 1 wherein a gaseous carbonaceous material is used.

3. The process as recited in claim 2 wherein the gaseous carbonaceous material is prepared by partial combustion of coal in the presence of $CaCO_3$ to provide CaO by reaction with carbon content thereof.

4. The process as recited in claim 1 wherein a solid carbonaceous material is used.

5. The process as recited in claim 1 wherein the mixture of hydrogen and steam is generated under pressure ranging to as high as 25 atmospheres.

* * * * *